United States Patent
Tertel

(10) Patent No.: US 9,938,474 B2
(45) Date of Patent: Apr. 10, 2018

(54) PROCESS FOR REMOVING GASES FROM A SWEETENED HYDROCARBON STREAM, AND AN APPARATUS RELATING THERETO

(71) Applicant: UOP LLC, Des Plaines, IL (US)

(72) Inventor: Jonathan Andrew Tertel, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 447 days.

(21) Appl. No.: 14/672,969

(22) Filed: Mar. 30, 2015

(65) Prior Publication Data
US 2015/0203767 A1 Jul. 23, 2015

Related U.S. Application Data

(62) Division of application No. 13/929,885, filed on Jun. 28, 2013, now Pat. No. 8,999,149.

(51) Int. Cl.
| | |
|---|---|
| *C10G 53/12* | (2006.01) |
| *B01J 19/24* | (2006.01) |
| *C10G 21/08* | (2006.01) |
| *C10G 19/00* | (2006.01) |
| *C10L 1/02* | (2006.01) |
| *C10G 19/02* | (2006.01) |
| *B01D 19/00* | (2006.01) |

(52) U.S. Cl.
CPC ......... *C10G 53/12* (2013.01); *B01D 19/0042* (2013.01); *B01J 19/24* (2013.01); *C10G 19/00* (2013.01); *C10G 19/02* (2013.01); *C10G 21/08* (2013.01); *C10L 1/02* (2013.01); *B01J 2219/24* (2013.01); *C10L 2200/043* (2013.01); *C10L 2290/548* (2013.01)

(58) Field of Classification Search
CPC ........ C10G 53/12; C10G 53/14; C10G 19/02; B01J 19/24; B01J 2219/24; B01J 8/02
See application file for complete search history.

(56) References Cited

U.S. PATENT DOCUMENTS

| | | | | |
|---|---|---|---|---|
| 3,260,665 A | * | 7/1966 | Urban | C10G 53/14 208/205 |
| 2011/0000823 A1 | * | 1/2011 | Hamad | C10G 21/12 208/236 |

* cited by examiner

*Primary Examiner* — Lessanework Seifu

(57) ABSTRACT

One exemplary embodiment can be a process for removing gases from a sweetened hydrocarbon stream. The process can include passing the sweetened hydrocarbon stream to a gas removal zone, contacting the sweetened hydrocarbon stream with an aqueous stream, passing the aqueous stream to the degassing drum, and removing gases including at least one of oxygen and nitrogen from the aqueous stream. Often, the gas removal zone includes a degassing drum.

5 Claims, 5 Drawing Sheets

PROCESS FOR REMOVING GASES FROM A SWEETENED HYDROCARBON STREAM, AND AN APPARATUS RELATING THERETO

CROSS-REFERENCE TO RELATED APPLICATION

This application is a Division of copending application Ser. No. 13/929,885 filed Jun. 28, 2013, the contents of which are hereby incorporated by reference in its entirety.

FIELD OF THE INVENTION

This invention generally relates to a process for removing gases from a sweetened hydrocarbon stream, and an apparatus relating thereto.

DESCRIPTION OF THE RELATED ART

Often, a naphtha and/or kerosene stream is sweetened by dissolving air into the stream to convert one or more thiol compounds into one or more disulfide compounds. Afterwards, the stream can be passed to tankage with reduced pressure, resulting in spent air exiting the hydrocarbon. This parted spent air can cause problems with the tank venting, as well as problems with product loss. Alternatively, the hydrocarbon stream after sweetening can be passed to a fractionation column. If the dissolved air is not removed, it may require upgrading the metallurgy on the top of the column, as well as injecting oxygen scavengers in the hydrocarbon. Thus, it would be beneficial to remove this dissolved air upstream of the tankage and/or fractionation.

SUMMARY OF THE INVENTION

One exemplary embodiment can be a process for removing gases from a sweetened hydrocarbon stream. The process can include passing the sweetened hydrocarbon stream to a gas removal zone, contacting the sweetened hydrocarbon stream with an aqueous stream, passing the aqueous stream to the degassing drum, and removing gases including at least one of oxygen and nitrogen from the aqueous stream. Often, the gas removal zone includes a degassing drum.

Another exemplary embodiment may be an apparatus for producing kerosene. The apparatus may include a reaction zone for receiving a combined stream of an alkaline, a hydrocarbon, and oxygen, and a gas removal zone having a vessel and a degassing drum. Typically, the gas removal zone is in communication with the reaction zone.

A further exemplary embodiment can be a process for removing gases from a sweetened hydrocarbon stream. Often, the process includes passing a hydrocarbon stream to a prewash vessel for contacting with an alkali stream to form a mixture, passing the mixture from the prewash vessel, adding air to the mixture to form a combined stream, passing the combined stream to a reaction zone to convert one or more thiol compounds in the hydrocarbon stream to one or more disulfide compounds, passing an effluent from the reaction zone to a gas removal zone having a degassing drum, transferring the gases in the hydrocarbon stream to an aqueous stream, and passing the aqueous stream to a degassing drum for removing oxygen and nitrogen.

The embodiments disclosed herein can utilize water on one side of a membrane and hydrocarbon on the other side. The dissolved gas can be transferred from the hydrocarbon to the water until typically both streams are in equilibrium.

Definitions

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of an alkali, such as sodium hydroxide, or gases such as oxygen.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can refer to an amount of generally at least about 50%, and preferably about 70%, by mole, of a compound or class of compounds in a stream. If referring to a solute in solution, e.g., one or more thiol compounds in an alkaline solution, the term "rich" may be referenced to the equilibrium concentration of the solute. As an example, about 5%, by mole, of a solute in a solvent may be considered rich if the concentration of solute at equilibrium is 10%, by mole.

As used herein, the term "substantially" can refer to an amount of at least generally about 80%, preferably about 90%, and optimally about 99%, by weight, of a compound or class of compounds in a stream.

As used herein, the term "parts per million" may be abbreviated herein as "ppm" and "weight ppm" may be abbreviated herein as "wppm". Generally, parts per million is based on weight unless otherwise indicated.

As used herein, the term "alkali" can refer to any substance that in solution, typically a water solution, has a pH value greater than about 7.0, and exemplary alkali can include sodium hydroxide, potassium hydroxide, or ammonia. Such an alkali in solution may be referred to as an alkaline solution or an alkaline.

As used herein, the term "thiol" can include a mercaptan and a salt thereof, such as a mercaptide. A thiol can be of the formula RSH or a salt of the formula $RS^-M^+$ where R is a hydrocarbon group, such as an alkyl or aryl group, that is saturated or unsaturated and optionally substituted, and M is a metal, such as sodium or potassium.

As used herein, the weight percent or ppm of sulfur, e.g., "wppm-sulfur" is the amount of sulfur in a hydrocarbon stream and not the amount of the sulfur-containing species unless otherwise indicated. As an example, methylthiol, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound.

As used herein, the term "lean alkaline solution" is an alkaline solution having been treated and having desired levels of sulfur, including one or more thiol compounds and/or one or more disulfides for treating one or more C1-C15 hydrocarbons in an extraction zone.

As used herein, the term "liquefied petroleum gas" can include one or more C3-C4 hydrocarbons and be abbreviated as "LPG".

As used herein, the term "naphtha" or "gasoline" can include one or more C5-C10 hydrocarbons and have a boiling point of about 25-about 190° C. at atmospheric pressure.

As used herein, the term "kerosene" can include one or more C9-C15 hydrocarbons and have a boiling point of about 160-about 275° C. at atmospheric pressure.

As used herein, the terms "degrees Celsius" may be abbreviated "° C." and the term "kilopascal" may be abbreviated "KPa" and all pressures disclosed herein are absolute.

As depicted, process flow lines in the figures can be referred to interchangeably as, e.g., lines, pipes, liquids, mixtures, solutions, discharges, effluents, alkalines, alkaline solutions, caustic, feeds, gases, products, or streams.

DETAILED DESCRIPTION

Figure 1:
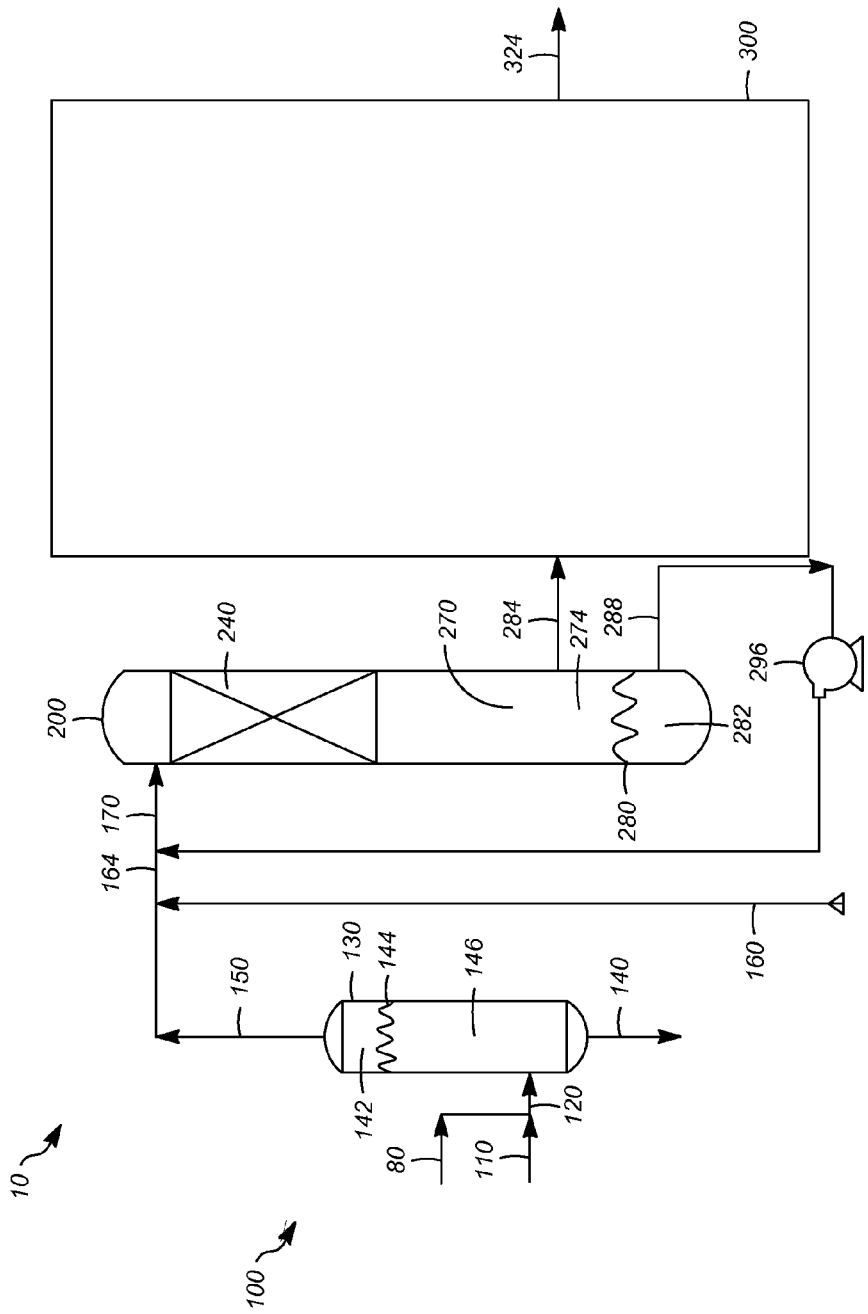
FIG. 1 is a schematic depiction of an exemplary apparatus.

Referring to FIG. 1, an exemplary apparatus 10 for producing a hydrocarbon fuel, such as gasoline or kerosene, can include a prewash zone 100, a reactor and settler vessel 200, and a gas removal zone 300. The apparatus 10 can convert or sweeten one or more thiol compounds present in a hydrocarbon feed 80 into one or more disulfide compounds, typically referred to as disulfide oils. The hydrocarbon feed 80 can include hydrocarbons boiling in the range of naphtha and/or kerosene.

The hydrocarbon feed 80 including one or more thiol compounds can be contacted with an alkaline or alkali stream 110 to form a combined feed 120. The alkali stream 110 can include an alkali, such as at least one of an ammonia, a potassium hydroxide and a sodium hydroxide.

Typically, the alkali stream 110 includes about 1-about 5%, preferably up to about 2%, by weight, alkali with the balance water. The combined feed 120 may be provided to the prewash zone 100.

Generally, the prewash zone 100 can include a prewash vessel 130 forming an interface 144 between a hydrocarbon phase 142 and an alkali phase 146. The alkali phase 146 can exit as a bottom stream 140. The hydrocarbon phase 142 can exit the prewash vessel 130 as a top stream 150. The top stream 150 can be combined with a stream 160 including oxygen, such as air, to form a mixture 164. The mixture 164 can be combined with a recycle stream 288, as hereinafter described, to form a combined stream 170. The combined stream 170 may be provided to the reactor and settler vessel 200.

An upper part of the reactor and settler vessel 200 can include a reaction zone 240 that may contain a bed having a catalyst. This catalyst may be supported on a bed of inert solids retained within the reaction zone 240. In other embodiments, the catalyst may be dispersed or dissolved in the aqueous alkaline solution. The catalyst may also be present in both a supported and a dissolved form. Any commercially suitable thiol oxidation catalyst can be employed, such as a catalyst including a metal compound of tetrapyridinoporphyrazine, preferably retained on an inert granular support. One preferred catalyst can be a metallic phthalocyanine, which may be a metal of titanium, zinc, iron, manganese, cobalt, or vanadium. Sulfonated derivatives may also be employed, such as a cobalt phthalocyanine monosulfonate or cobalt phthalocyanine disulfonate, or carboxylated derivatives may be employed as well. Exemplary catalysts are disclosed in, e.g., U.S. Pat. No. 4,481,106. In the reaction zone 240, thiol compounds can be converted into disulfide compounds. An exemplary reactor is disclosed in, e.g., U.S. Pat. No. 7,223,332. An effluent can exit the reaction zone 240 and fall to a settling zone 270.

The settling zone 270 can allow a hydrocarbon phase 274 separate from an alkaline phase 282 at an interface 280. An alkali or the recycle stream 288 may be withdrawn and provided to a pump 296 and discharged to the mixture 164. Optionally, a portion of the alkali stream 288 may be purged. The hydrocarbon phase 274 can be withdrawn as a sweetened hydrocarbon stream 284 including one or more disulfide compounds interspersed with a naphtha and/or a kerosene hydrocarbons. The hydrocarbon phase 274 may be provided to the gas removal zone 300 from which is obtained a hydrocarbon or a processed hydrocarbon stream 324.

Figure 2:
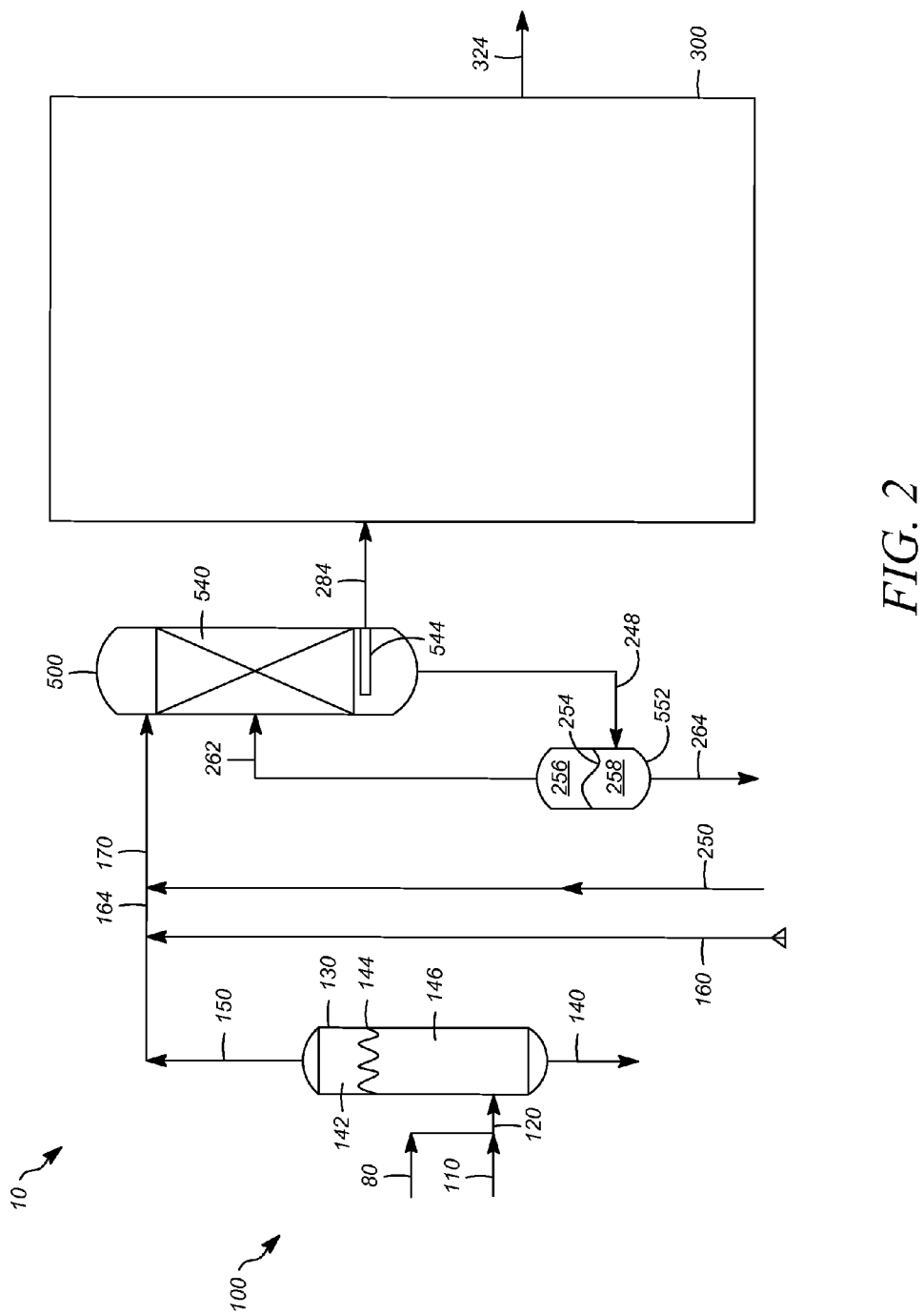
FIG. 2 is a schematic depiction of another exemplary apparatus.

Referring to FIG. 2, an another exemplary apparatus 10 for producing a hydrocarbon fuel, such as gasoline or kerosene, can include the prewash zone 100, a reactor 500, a drain pot 552, and the gas removal zone 300. The prewash zone 100 and the gas removal zone 300 can be substantially similar as described above. The apparatus 10 can convert or sweeten one or more thiol compounds present in the hydrocarbon feed 80 into one or more disulfide compounds, typically referred to as disulfide oils. The hydrocarbon feed 80 can be substantially similar, as described above.

The hydrocarbon feed 80 can be contacted with the alkaline or alkali stream 110 to form the combined feed 120, which may be sent to the prewash zone 100 to obtain a top stream 150, as described above. The top stream 150 can be combined with the stream 160 including oxygen, such as air, to form a mixture 164. The mixture 164 can be combined with an alkali stream 250, typically dilute having about 1-about 5%, preferably up to about 2%, by weight, alkali with the balance water to form a combined stream 170. The combined stream 170 may be provided to the reactor 500.

The reactor 500 can include a reaction zone 540 that may contain a bed having a catalyst and a collector 544. The catalyst may be supported on a bed of inert solids retained within the reaction zone 540. In other embodiments, the catalyst may be dispersed or dissolved in the aqueous alkaline solution. The catalyst may also be present in both a supported and a dissolved form. Any commercially suitable thiol oxidation catalyst can be employed, such as a catalyst including a metal compound of tetrapyridinoporphyrazine, preferably retained on an inert granular support. One preferred catalyst can be a metallic phthalocyanine, which may be a metal of titanium, zinc, iron, manganese, cobalt, or vanadium. Sulfonated derivatives may also be employed, such as a cobalt phthalocyanine monosulfonate or cobalt phthalocyanine disulfonate, or carboxylated derivatives may be employed as well. Exemplary catalysts are disclosed in, e.g., U.S. Pat. No. 4,481,106. In the reaction zone 540, thiol compounds can be converted into disulfide compounds. An effluent can exit the reaction zone 540 and pass downstream to the collector 544, which can collect a sweetened hydrocarbon and be withdrawn as a sweetened hydrocarbon stream 284 and sent to the gas removal zone 300, as hereinafter described. An alkali phase can drop to the bottom of the reactor 500 and be withdrawn as an alkali stream 248 and provided to the drain pot 552.

The fluids in the drain pot 552 can separate into a hydrocarbon phase 256 forming an interface 254 with an alkali phase 258. A line 262 coupled to the top of the drain pot 552 can communicate the hydrocarbon phase 256 back to the reaction zone 540 within the reactor 500. A line 264 coupled to the bottom of the drain pot 552 can withdraw the alkali phase 258 from the drain pot 552 and be purged as a stream 264.

Figure 3:
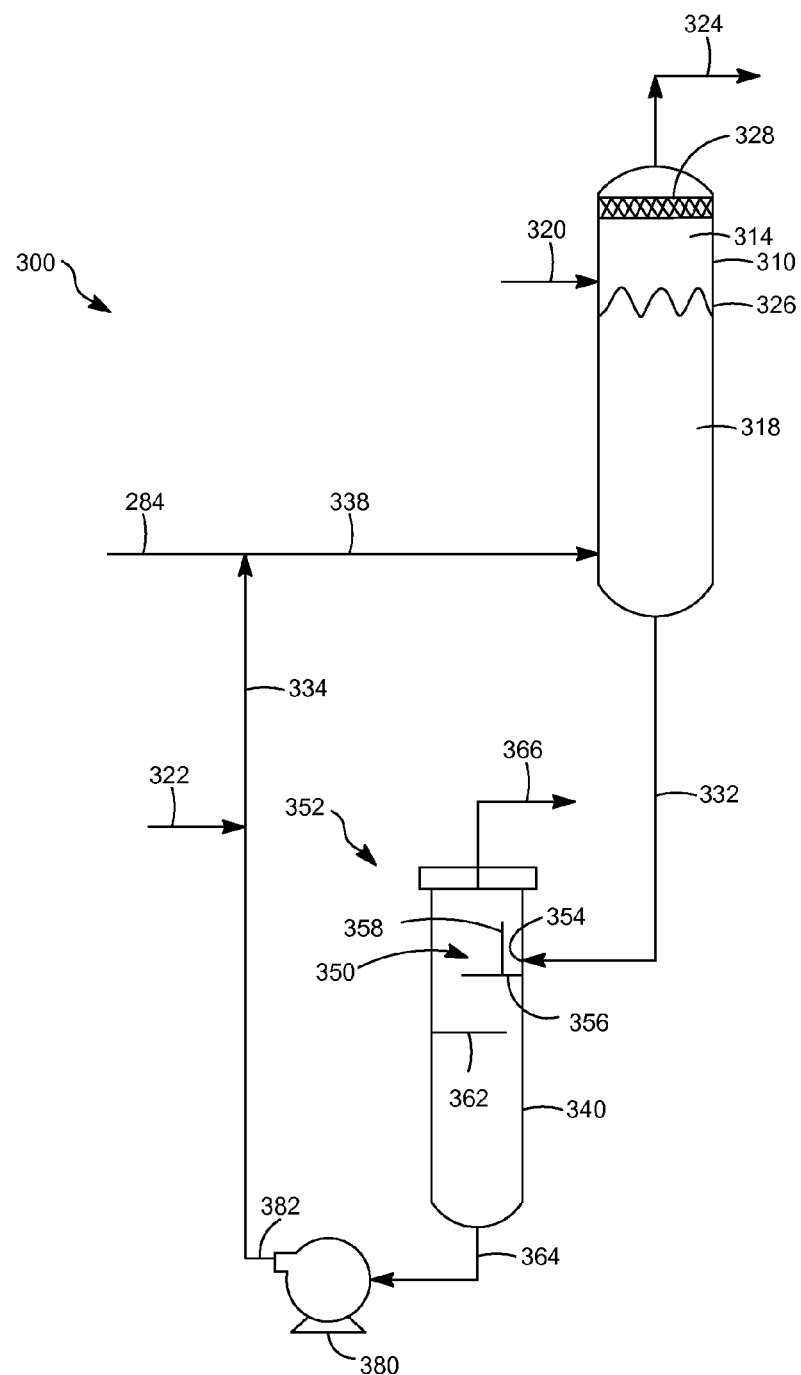
FIG. 3 is a schematic depiction of an exemplary gas removal zone.

One exemplary version of the gas removal zone 300 is disclosed in FIG. 3. In this exemplary embodiment, the gas removal zone 300 can include a water wash vessel 310, a degassing drum 340, and a pump 380. The sweetened hydrocarbon stream 284 can be provided to the gas removal zone 300 and include one or more disulfide compounds as well as one or more hydrocarbons in the naphtha and/or kerosene boiling range. The sweetened hydrocarbon stream 284 can combined with a combined aqueous stream 334 including a make-up stream 322 and a recycled aqueous stream 382, as hereinafter described, to form a combined stream 338 provided to the water wash vessel 310. The water wash vessel 310 can also receive a water wash stream 320, including substantially water, and may contain a mesh 328, and a hydrocarbon phase 314 and an aqueous phase 318 forming an interface 326. The mesh 328 can have one or more metal wires, such as stainless steel or fiberglass, or metal fibers with a hydrophilic coating, for coalescing water droplets entrained in the hydrocarbon phase 314. One exemplary mesh may include a coating sold under the trade designation COALEX or KOCH-OTTO YORK™ separations technology by Koch-Glitsch, LP of Wichita, Kans. The coalesced water droplets may fall to the base of the water wash vessel 310. Typically, the water wash vessel 310 is at a temperature of about 4-about 99° C., preferably about 35-about 50° C., and a pressure of about 440-about 1,900 KPa. In the water wash vessel 310, the gas can transfer from the hydrocarbon phase 314 to the aqueous phase 318 by arriving at an equilibrium at the interface 326 between the two phases 314 and 318. The hydrocarbon phase 314 can exit as a hydrocarbon stream 324, and the aqueous phase 318 can exit as a bottom stream 332.

The bottom stream 332 may be provided to the degassing drum 340. Often, the degassing drum 340 contains a contacting zone 350. The contacting zone 350 may include a plurality of trays 352, such as a first tray 356 positioned above a second tray 362. The first tray 356 may be proximate to an inlet 354 and be integrally formed with a substantially vertical weir 358. Usually, the weir 358 is substantially perpendicular to the first tray 356 to create an enclosure that fills with liquid and overflows the weir 358. The degassing drum 340 may be at a pressure of about 100-about 300 KPa. Typically, the lower part of the degassing drum 340 may be at a lower pressure than the contacting zone 350 for facilitating the separation of gases based on the solubility in the liquid at varying pressures within the degassing drum 340. Gases 366, such as nitrogen and oxygen, can separate from the liquid and exit the upper portion of the degassing drum 340. Liquids may fall to the second tray 362 and exit the bottom of the degassing drum 340 as a recycled aqueous stream 364. Optionally, some of aqueous stream 364 may be purged before being provided to the suction of the pump 380. The pump discharge 382 may receive a make-up stream 322 to form the combined aqueous stream 334, as discussed above.

Figure 4:
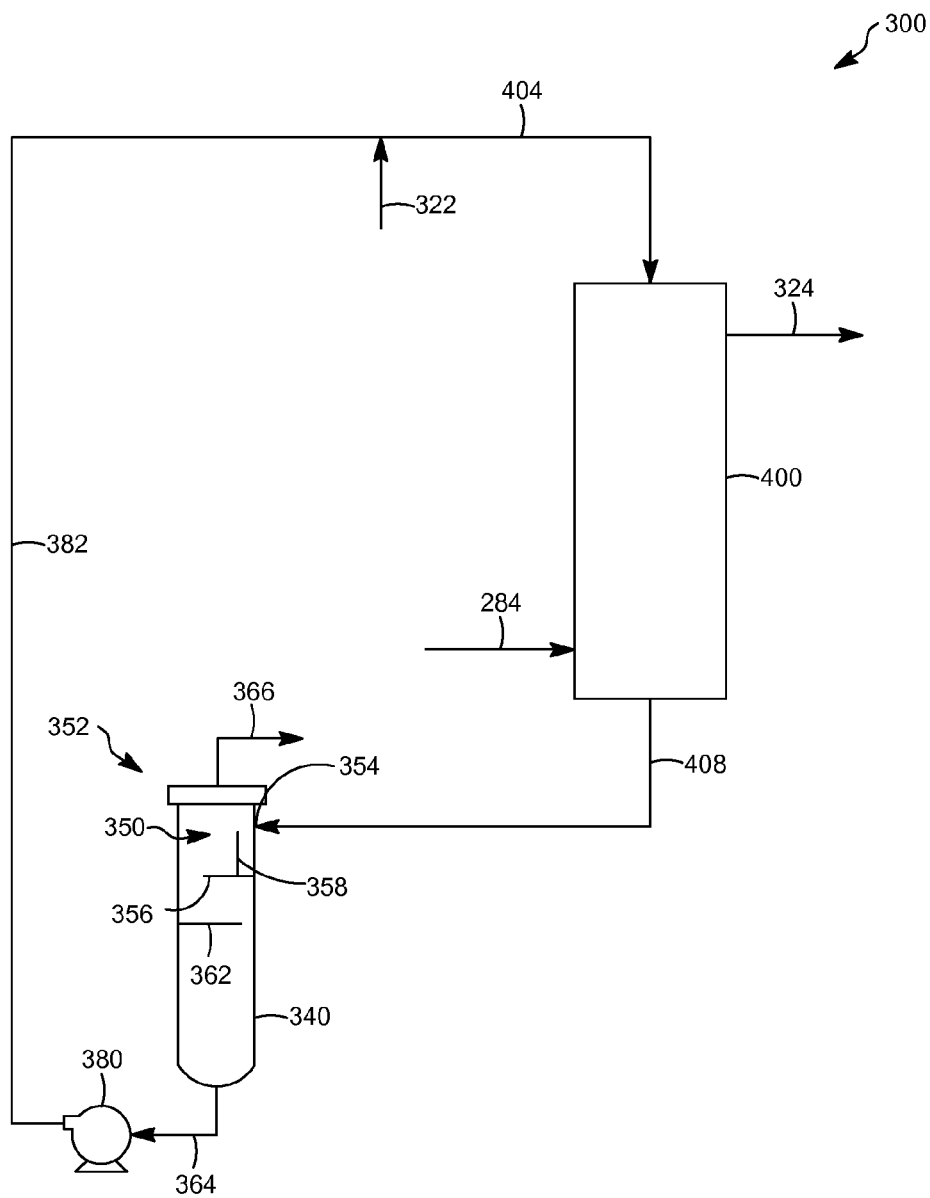
FIG. 4 is a schematic depiction of another exemplary gas removal zone.
Figure 5:
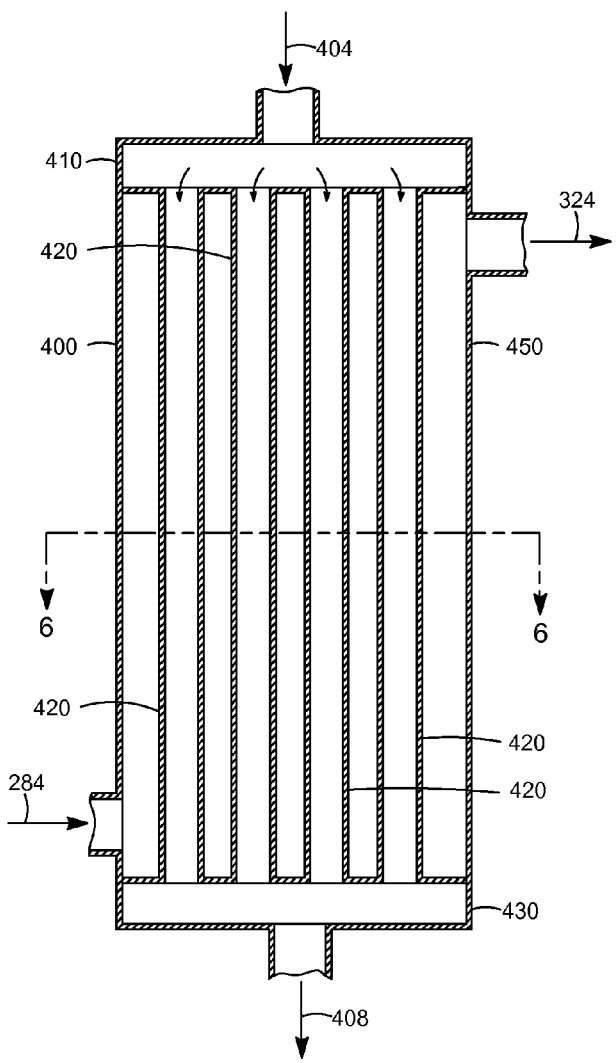
FIG. 5 is an elevational, cross-sectional depiction of an exemplary hollow fiber membrane.
Figure 6:
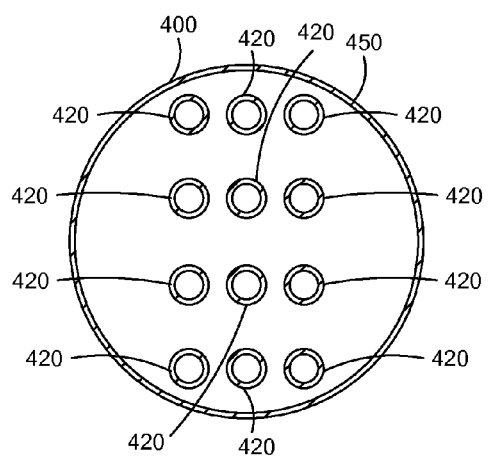
FIG. 6 is an elevational, cross-sectional depiction along line 6-6 of FIG. 5.

Referring to FIGS. 4-6, another exemplary version of the gas removal zone 300 is disclosed. This version of the gas removal zone 300 can include a hollow fiber membrane 400, the degassing drum 340, and the pump 380. The degassing drum 340 and the pump 380 have been discussed above. Generally, the hollow fiber membrane 400 can receive an aqueous stream 404 and provide an aqueous stream 408 and can receive the sweetened hydrocarbon stream 284 and provide a processed hydrocarbon or hydrocarbon stream 324.

Referring to FIGS. 5-6, the hollow fiber membrane 400 can include a shell 450 with a first chamber 410, a second chamber 430, and at least one tube 420. In this exemplary embodiment, the hollow fiber membrane 400 can include twelve tubes 420, although the hollow fiber membrane 400 can include any suitable number of tubes, including multiple tubes of thousands of tubes. The hollow fiber membrane 400 may have hydrophobic and hydrophilic properties and include at least one of a ceramic, cellulose acetate, polypropylene, polysulfone, polyamide, and polytetrafluoroethylene.

The aqueous stream 404, including substantially water, can pass through the tubes 420. Generally, the walls of the tubes 420 can be porous. The gases may pass from the sweetened hydrocarbon stream 284 into the aqueous stream 404.

Although the tubes 420 are described as porous, non-porous tubes can be used as well. The transfer through a non-porous, solvent-swelled membrane is by diffusion, a process of mass-transfer which can occur as a movement of individual molecules. This movement of the gas molecules can be induced by the partition coefficient of the gas solute in the two immiscible solvents. A non-porous, swelled membrane may be viewed as a form of gel. The solvents and solute involved in the extraction all interact with the membrane to form a single phase, polycomponent system. Such non-porous membranes are disclosed in, e.g., U.S. Pat. No. 3,956,112.

Particularly, the one or more gases can diffuse through the liquid filling the membrane pores and into the aqueous stream 404, which can be provided counter-currently to the sweetened hydrocarbon stream 284. Typically, the one or more gases are transferred at the pores of the membrane to the aqueous stream 404 because the one or more gases have a much greater mass transfer affinity in the aqueous phase than, e.g., the naphtha or kerosene, comprised in the sweetened hydrocarbon stream 284. Generally, both the tube and shell sides of the hollow fiber membrane 400 are maintained at about the same pressure to limit dispersive mixing.

Although a single hollow fiber membrane 400 is depicted, it should be understood that two or more hollow fiber membranes may be utilized in parallel and/or series. Moreover, the sweetened hydrocarbon stream 284 may be routed to the tube side of the hollow fiber membrane bundle with the aqueous stream 404 routed to the shell 450 side. Although a counter-current flow scheme is disclosed, it should be understood the streams can be introduced co-currently.

Referring back to FIG. 1 or 2 and 4 in operation, the sweetened hydrocarbon stream 284 can be provided from the reactor and settling vessel 200 in FIG. 1 or the reactor 500 in FIG. 2 to the shell side of the hollow fiber membrane 400. Simultaneously, the aqueous stream 404 may be provided to the tube side of the hollow fiber membrane 400. Gases present in the sweetened hydrocarbon stream 284 can transfer into the aqueous stream 404. Preferably, the aqueous stream 404 is provided at a rate sufficient to remove gases from the hydrocarbons to less than atmospheric partial pressure to minimize gases exiting the hydrocarbons in storage or fractionation. If fractionation is downstream, an even higher rate of the aqueous stream 404 may be required to remove additional gases. Typically, the hollow fiber membrane 400 is at a temperature of about 4-about 99° C., preferably about 35-about 50° C., and a pressure of about 440-about 1,900 KPa. The water side and hydrocarbon side may be at substantially the same pressure in the hollow fiber membrane 400. Afterwards the hydrocarbon stream 284 may be withdrawn from the hollow fiber membrane 400 as the processed hydrocarbon stream 324.

The aqueous stream 408 laden with gases may be sent to the degassing drum 340. Gases 366 including at least one oxygen and nitrogen can be withdrawn from the degassing drum 340 as well as the recycled aqueous stream 364, as described above for the previous version. The recycled aqueous stream 364, optionally with a portion purged, can be discharged from the pump 380 as a stream 382 and be combined with the make-up stream 322 to form the aqueous stream 404.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for producing kerosene, comprising:
   A) a reaction zone for receiving a combined stream of an alkaline, a hydrocarbon, and oxygen, the reaction zone having an inlet and at least one liquid outlet; and
   B) a gas removal zone comprising a vessel and a degassing drum wherein the gas removal zone is in liquid communication with the reaction zone, the vessel having a liquid inlet, an aqueous liquid outlet, and a hydrocarbon liquid outlet, the liquid inlet of the vessel being in liquid communication with the liquid outlet and a gas outlet, the aqueous liquid outlet of the vessel being in liquid communication with the liquid inlet of the degassing drum.

2. The apparatus according to claim 1, wherein the vessel comprises a hollow fiber membrane.

3. The apparatus according to claim 1, wherein the vessel comprises a water wash vessel.

4. The apparatus according to claim 1, further comprising a prewash vessel upstream of the reaction zone.

5. The apparatus according to claim 1, wherein the vessel further has a wash liquid inlet at the end of the vessel opposite the aqueous liquid outlet, and wherein the liquid inlet of the vessel and the hydrocarbon liquid outlet are at opposite ends of the vessel.

* * * * *